United States Patent
Granot et al.

(10) Patent No.: US 6,466,249 B1
(45) Date of Patent: Oct. 15, 2002

(54) ROTATABLE CONNECTOR FOR USE WITH A VIDEO CONFERENCE SYSTEM

(75) Inventors: Yeuda Granot, Kfar Ma'as (IL); Gideon Ashkenazi, Ra'anana (IL)

(73) Assignee: Vcon Telecommunications Ltd., Herzlia (IL)

( * ) Notice: Subject to any disclaimer, the term of this patent is extended or adjusted under 35 U.S.C. 154(b) by 0 days.

(21) Appl. No.: 09/567,135

(22) Filed: May 8, 2000

(51) Int. Cl.$^7$ ................................................. H04N 7/14
(52) U.S. Cl. ................. 348/14.08; 348/14.04; 379/420.01; 379/428.01; 248/346.01
(58) Field of Search ............ 348/14.01, 14.02, 348/14.03, 14.04, 14.05, 14.06, 14.07, 14.08, 14.09, 14.16, 373, 374, 375, 376; 379/420, 454, 446, 428; 248/371, 393, 346.01; 381/386, 387, 388

(56) References Cited

U.S. PATENT DOCUMENTS 5,528,690 A * 6/1996 Shahrebani ................. 379/438
5,652,619 A 7/1997 Nakamura et al.

FOREIGN PATENT DOCUMENTS

| JP | 363274034 A | * 11/1988 | ............ H01H/1/02 |
| JP | 402051996 A | * 2/1990 | ............ H04Q/3/58 |

* cited by examiner

*Primary Examiner*—Melur Ramakrishnaiah
(74) *Attorney, Agent, or Firm*—Eitan, Pearl, Latzer & Cohen-Zedek

(57) ABSTRACT

A video conference system is provided having a base assembly and a loudspeaker assembly in communication with the base assembly by means of a rotable connector is provided. The rotatable connector has an array of springy contacts which are engageable with a compatible array of slide rings, which allows the loudspeaker assembly to be enabling the manually rotated independently of the base assembly, without the loss of electrical contact between the base assembly and the loudspeaker assembly.

6 Claims, 4 Drawing Sheets

ROTATABLE CONNECTOR FOR USE WITH A VIDEO CONFERENCE SYSTEM

FIELD OF THE INVENTION

The invention relates to the field of video conference systems, and more specifically to means for rotatably connecting components of video conference systems.

BACKGROUND OF THE INVENTION

Video conference systems are well-known. These systems contain a dedicated device that is positioned at each of the sites where the video conference takes place. Basically, such a device includes a video camera, loudspeaker and electronic cards, which are generally wired together.

The designated device may be connected to a personal computer, for example, a video conference systems which operates via the Internet.

An obvious drawback of the devices known in the field is their lack of flexibility in terms of the users' ability to move and change the relative position of the device's elements. From the users' standpoint, this is a "human engineering" problem of the system. Thus, for example, the user of an Internet-based video conference system wishing to use his portable ('lap-top') computer for this purpose, may find the designated device (such as the video camera) hidden behind the raised lid of his portable computer. Even after the device has been elevated, for example, by stabilizing the device and placing it on some kind of support, the device still cannot be conveniently rotated so as to face towards different participants.

Video conference systems containing a remote controlled mobile camera device are also known. Such a device is described, for example, in Patent U.S. Pat. No. 5,652,619. A television camera is located inside a movable casing and capable of rotation and inclination from instructions received from a distance. The system contains a gear drive, an infra-red sensor that receives the commands from a distance and a power supply and signal input/output section located at the back portion of the fixed casing.

Such remote-controlled mobile camera device have several disadvantages, including the complexity and expense of the gear drive and the sensor.

SUMMARY OF THE INVENTION

Thus, in the field of video conference systems, there is a need for a device that can be positioned on a surface (such as, a table) on which a computer may also be placed, so that the device supporting the video camera is not concealed by the computer.

There is also a need for a device that can be manually rotated and faced toward the people present at the site without having to activate any mechanical drivers for this purpose and without affecting the stability of the device's position on the surface.

There is thus provided, in accordance with a preferred embodiment of the invention, a video conference system is provided having a base assembly and a loudspeaker assembly in communication with the base assembly by means of a rotatable connector is provided. The rotatable connector has an array of springy contacts which are engageable with a compatible array of slide rings, which allows the loudspeaker assembly to be enabling the manually rotated independently of the base assembly, without the loss of electrical contact between the base assembly and the loudspeaker assembly.

In another preferred embodiment of the invention, the system further includes a camera assembly mounted on the loudspeaker assembly so that the total height of the assemblies—the loudspeaker assembly being mounted on the base assembly, and the camera assembly being mounted on the loudspeaker assembly—are substantially at the height of a portable computer whose lid is open.

Furthermore, in accordance with a preferred embodiment of the invention, the loudspeaker assembly is mounted on the base assembly by utilizing a "snap" type connector means of the spring ring type.

Furthermore, in accordance with a preferred embodiment of the invention, the "snap" connector includes a peripheral groove formed at the end of the loudspeaker assembly and a corresponding groove formed in a sleeve located within the base assembly, the corresponding groove serving as a base for the spring ring. The end of the loudspeaker assembly is receivable within the sleeve.

Furthermore, in accordance with a preferred embodiment of the invention, the base assembly includes a housing having at least one printed circuit within it.

Furthermore, in accordance with a preferred embodiment of the invention, the array of springy contacts includes at least one pair of contacts dedicated to at least one of the slide rings thereby ensuring redundancy of the contact between them. The springy contacts are formed from a strip of springy metal, which may be a highly conductive material, such as gold.

Furthermore, in accordance with a preferred embodiment of the invention, the electrical contact comprises a shared ground contact, a minus contact to the loudspeaker, a plus contact to the loudspeaker, and a contact to the indicator lamp. The electrical contact includes in addition, an indicator contact enabling to indicate the presence of the loudspeaker assembly mounted on the base assembly.

In addition, in accordance with a preferred embodiment of the invention, wherein the array of springy contacts are located within the base assembly and the array of slide rings is located on the lower surface of the loudspeaker assembly. The array of springy contacts is mounted on the surface of a printed circuit within the base assembly.

BRIEF DESCRIPTION OF THE DRAWINGS

The present invention will be understood and appreciated more fully from the following detailed description taken in conjunction with the appended drawings, in which.

DETAILED DESCRIPTION OF THE INVENTION

Figure 1:
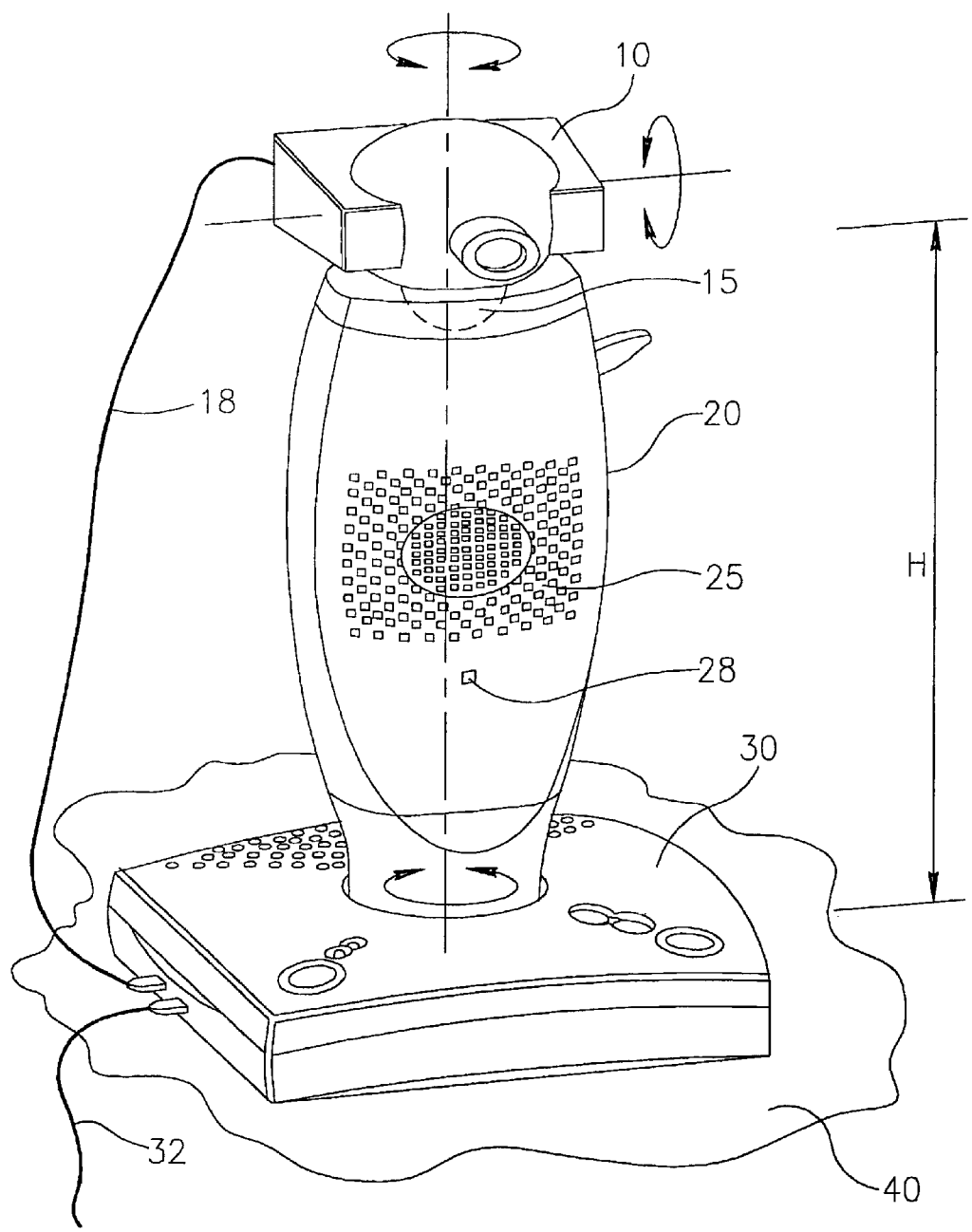
FIG. 1 is an isometric view of the video conference system, constructed and operative in accordance with a preferred embodiment of the present invention.

Reference is now made to FIG. 1, which is isometric view of the video conference system, constructed and operative in accordance with a preferred embodiment of the present invention. The system includes three main assemblies—a video camera assembly 10, a loudspeaker "tower" assembly 20, and a base assembly 30. The video conference system is shown positioned on a surface of a table 40, for example. The camera 10 is mounted on the loudspeaker "tower" assembly 20, which is itself mounted on the base 30, so that the camera is positioned at a height (H) which is configured to allow the camera a field of vision even if a portable ('lap-top') computer (not shown) with its lid open, is placed on the table 40 in front of the camera 10.

The camera 10 can be rotated manually and inclined independently towards the photographed object, by means of a hemispherical base 15, as shown in FIG. 1. The camera wiring (power and image data) 18 is connected to the base 30, and is long enough to prevent twisting when the direction of the camera 10 is changed. In the example of FIG. 1, the camera wiring (power and image data) 18 is shown as externally wired. However, It will be appreciated by persons knowledgeable in the art, that the camera wiring (power and image data) 18 may also be connected to the base 30 within and through the loudspeaker "tower" assembly 20, so as to be hidden from view.

The "tower" assembly 20 includes a loudspeaker 25 and an LED type lamp indicator 28. The loudspeaker "tower" can be rotated manually and independently in relation to the base 30 and without moving the base 30. The wiring of the loudspeaker 25 and the indicator lamp 28 to the base 30 is connected by means of the rotatable connector, generally designated 45, described hereinafter.

As hereinbefore mentioned, the base 30, which is positioned, on the surface 40, receives the loudspeaker "tower" 20 with the camera 10 at its top. The base 30 is wired to the computer (not shown) and to a power supply (the computer or an external means) by means of wiring 32, for example.

Figure 2:
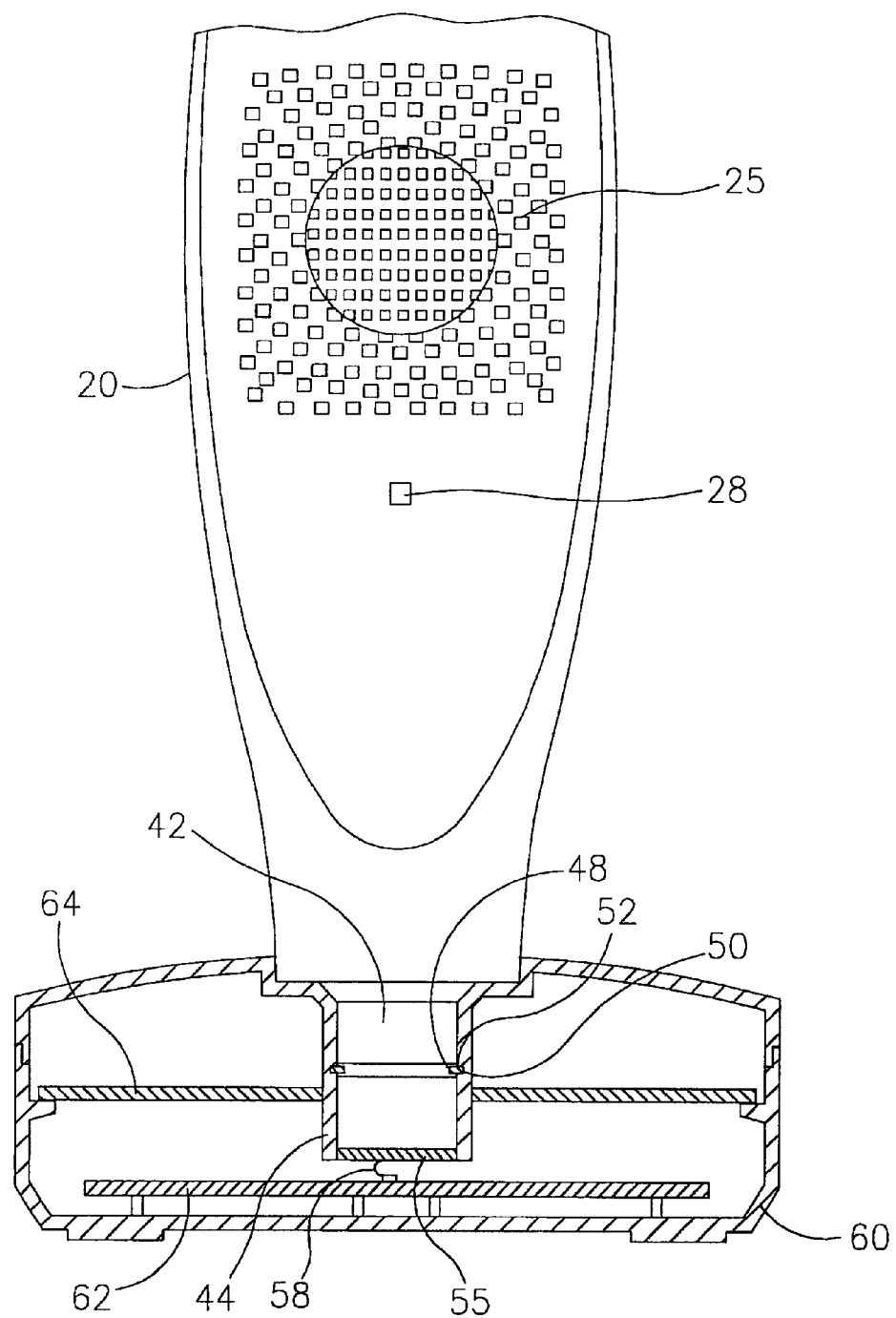
FIG. 2 is an elevational sectional view of the rotatable connector sued in the system of FIG. 1.

Reference is now made to FIG. 2, which is an elevational sectional view of the connector 45, connecting the loudspeaker "tower" 20 to the base 30. The loudspeaker "towed" 20 is configured with a projecting element 42 at one end which fits inside a sleeve 44 formed in the base 30, A peripheral groove 48 is formed on the circumference of the projecting element 42, and a corresponding groove 50 is formed in the sleeve 44 in the base 30. The corresponding groove 50 serves as a base for a spring ring 52 located inside the groove.

The spring ring 52 is configured so that the projecting element 42 can only be inserted and removed by the application of force. When the peripheral groove 48 is positioned opposite the spring ring 52, the ring is inserted into it. At this point, additional force is required to enable the extraction of the loudspeaker "towed" 20 from the base 30. The spring ring 52 also enables the loudspeaker "tower" to be rotated with respect to the base 30 (as shown by the arrows in FIG. 1).

It will be appreciated by persons knowledgeable in the mechanical field and familiar with a "snap" type connector, that the action of this connector is sometimes also accompanied by a sound (a "click" which indicates that the male element has snapped into the female socket or become disengaged from it).

In the illustrated example, the lower surface of the projecting element 42 has installed on it an array of slide rings 55—electric contacts that are wired to the loudspeaker 20 and the indicator lamps 28 (the wiring is not shown).

The array of slide rings 55 at the end of the loudspeaker "tower" 20 engage a compatible array of springy contacts 58 located on the base 30 in the manner described hereinafter, with reference to FIG. 3. For purposes of illustration, only one springy contact 58 is shown in FIG. 2.

In the illustrated example, the base 30 consists of a housing 60 with two printed circuits 62 and 64 installed within the housing. It will be appreciated by persons knowledgeable in art that these printed circuits can contain electronic elements (processor and the like) which are required for operating a video conference system having a computer interface (not shown), for example.

Figure 3:
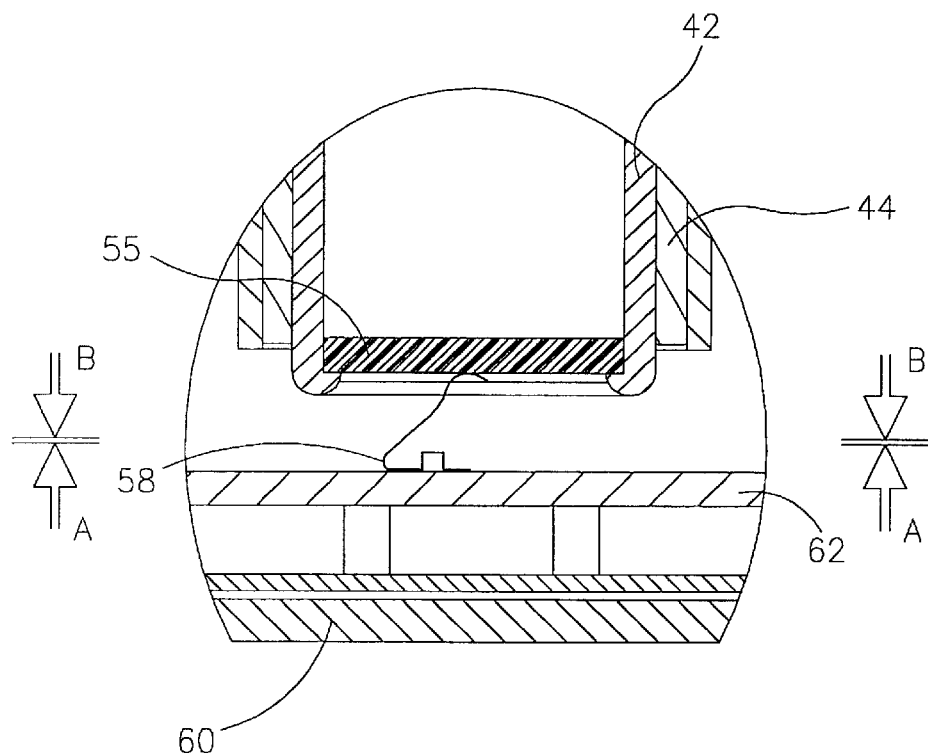
FIG. 3 is an enlarged view of the rotatable connector of FIG. 2.

Reference is now made to FIG. 3, which is an enlarged view of part of the connector (referenced C). The slide rings 55 at the end of the loudspeaker "tower" 20 engage an array of springy contacts 58 attached to the base 30. For purposes of illustration, only one springy contact 58 is drawn. The springy contact 58 is harnessed to the printed circuit 62 and protrudes from its surface. In the illustrated example, the springy contact 68 is formed from a strip of springy metal coated with a highly conductive material (such as gold). Pressure of the slide ring 55 on the springy contact 58 causes the contact to bend while remaining in close contact with the ring and biased towards it.

Figure 4:
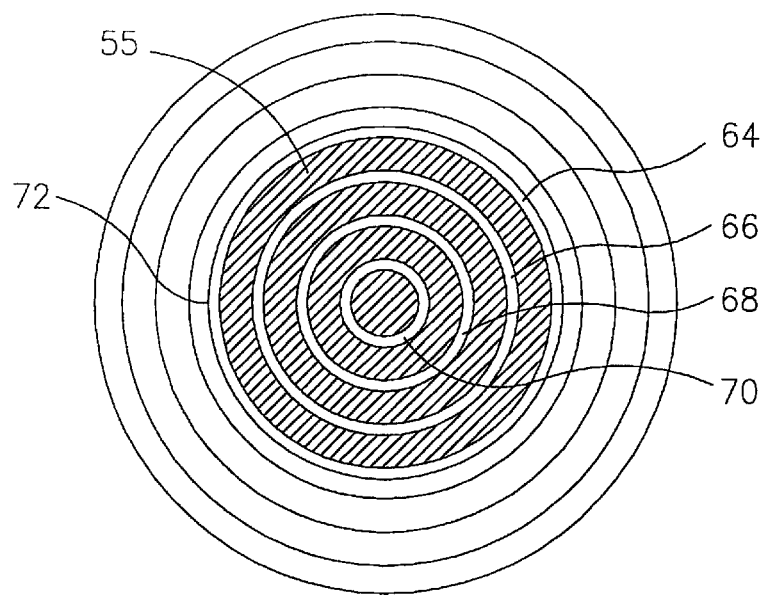
FIG. 4 is a sectional view of the array of slide rings associated with rotatable connector of FIG. 2.

Reference is now made to FIG. 4, which is a sectional view of the array of slide rings according to section A—A in FIG. 3. The array of slide rings 55 in the illustrated example includes a shared ground contact 65, a minus contact 66 to the loudspeaker 25, a plus contact 68 to the loudspeaker 25, a contact to the indicator lamps 28 and an indicator contact 72 which indicates the presence of the loudspeaker "tower" 20 within base 30 (in the illustrated example—the shared ground contact 64 serves for this purpose). The wiring from the slide rings, which may be any suitable wiring by a person skilled in the art, is not described.

Figure 5:
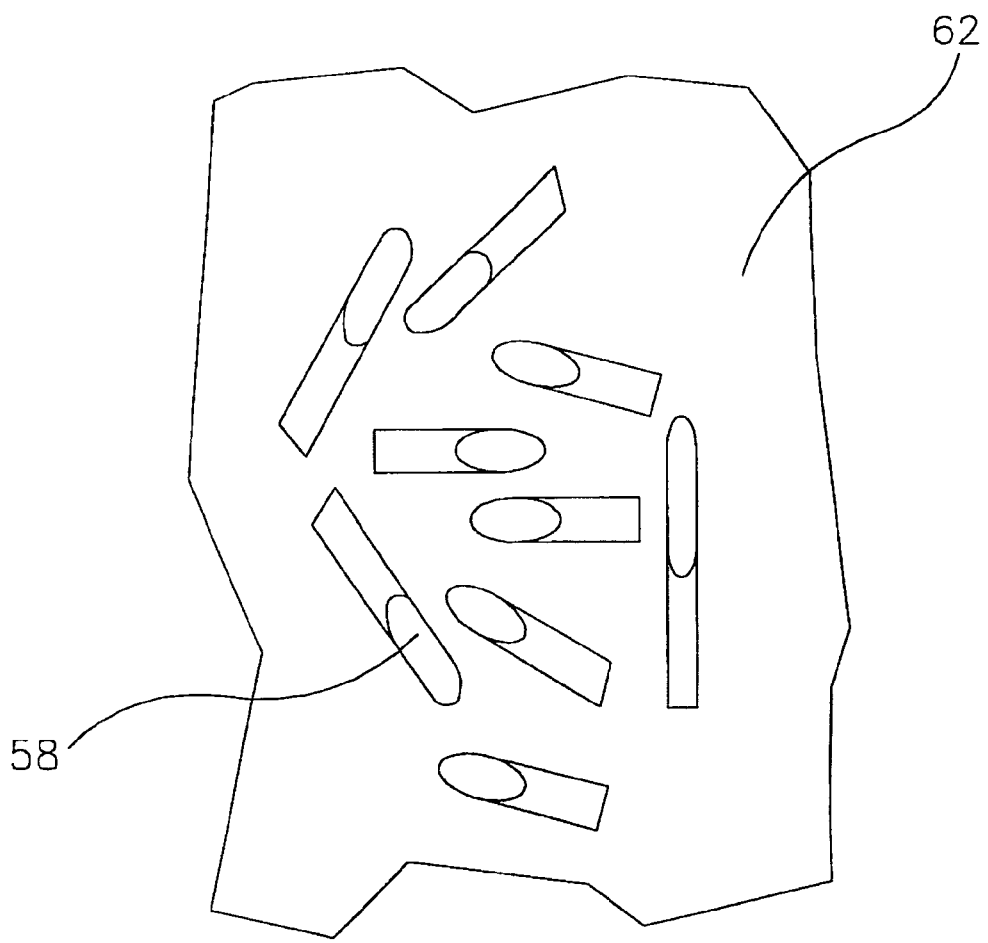
FIG. 5 is a sectional view of the system of contacts associated with rotatable connector of FIG. 2.

Reference is now made to FIG. 5, which is an elevational view of the array of contacts according to section B—B in FIG. 3. The system of springy contacts 58 is shown positioned on the printed circuit 62. In the illustrated example, in order to ensure redundancy, two springy contacts 58 are designated for each slide ring 55 installed at the end of the projecting element 42 (see FIG. 2). The wiring from the springy contacts is not shown, may be any suitable wiring by a person skilled in the art, is not described.

In addition, any person skilled in the art will appreciate that the desirable engagement between the array of springy contacts and the array of compatible slide surfaces, can be achieved at the side of projecting element 42, for example, by locating an array of slide rings around it, engaging an array of springy contacts located within sleeve 44 or vice versa).

In operation, the loudspeaker "tower" 20 is mounted on the base 30 by inserting the projecting element 42 inside the sleeve 44. The spring ring 52 expands inside the groove 48, and in this situation, the lower end of the projecting element 42, with the slide rings 55 installed inside it, presses and bends the array of springy contacts 58, thereby ensuring close contact between each slide ring and the pair of springy contacts connected to it.

Manual rotation of the loudspeaker "tower" 20 in relation to the base 30 does not cause the conductivity contact between the array of slide rings 55 and the array of springy contacts 58 to be severed. The slide rings 55 slide on a horizontal plane parallel to the ends of the springy contacts 58, which therefore remain compressed by them. The spring ring 52 ensures that the assemblies will not become disconnected from one another except through the application of intentional extraction force.

Manual disconnection of the loudspeaker "towers" 20 from the base 30 (for example, for dismantling the device)

is performed by applying an extraction force so as to overcome the resistance of the spring ring 52, which has been urged inside groove 50. In this way, it is possible to remove the loudspeaker "tower" 20 from inside the base, and thus, sever the contacts.

While the present invention has been described with reference to a specific embodiment, the description is intended to be illustrative of the invention as a whole, and is not to be construed as limiting the invention to the embodiment shown. It is appreciated that various modifications, which may occur to those skilled in the art, while not specifically shown herein, are nevertheless within the true spirit and scope of the invention.

What is claimed is:

1. A video conference system comprising:

a base assembly;

a loudspeaker assembly in communication with said base assembly by means of a rotable connector, said rotatable connector having an array of springy contacts engageable with a compatible array of slide rings, thereby enabling the manual rotating of said loudspeaker assembly independently of said base assembly, without the loss of electrical contact between said base assembly and said loudspeak assembly; and a camera assembly mounted on said loudspeaker assembly, wherein the total height of the assemblies—said loudspeaker assembly being mounted on said base assembly, and said camera assembly being mounted on said loudspeaker assembly—being substantially the height of a portable computer whose lid is open.

2. The system according to claim 1, wherein said camera assembly is provided with a base enabling manual inclination and direction of said camera independently in relation to said loudspeaker assembly.

3. The system according to claim 2, wherein said base is a hemispherical in shape.

4. The system according to claim 1, wherein said camera assembly is wired externally to said base assembly or through said loudspeaker assembly.

5. A video conference system comprising:

a base assembly; and a loudspeaker assembly in communication with said base assembly by means of a rotatable connector, said rotatable connector having an array of springy contacts engageable with a compatible array of slide rings, thereby enabling the manual rotating of said loudspeaker assembly independently of said base assembly, without the loss of electrical contact between said base assembly and said loudspeaker assembly;

wherein said loudspeaker is in communication with said base assembly by means of a "snap" type connector with a spring ring, and wherein said "snap" connector comprises a peripheral groove formed at the end of said loudspeaker assembly and a corresponding groove formed in a sleeve located within said base assembly, said corresponding groove serving as a base for said spring ring, and wherein the end of said loudspeaker assembly is receivable within said sleeve.

6. The system according to claim 5, wherein the connection of said loudspeaker assembly to said base assembly produces an audible "click"-type sound.

* * * * *